United States Patent [19]

Lord et al.

[11] Patent Number: 5,267,676
[45] Date of Patent: Dec. 7, 1993

[54] LIQUID DISPENSER FOR USE WITH WASHING MACHINE

[76] Inventors: Anita C. Lord, 182 Old Mill Way, Conyers, Ga. 30208; Jack J. Gilbert, 740-E Hembree Pl., Roswell, Ga. 30076

[21] Appl. No.: 864,421

[22] Filed: Apr. 6, 1992

[51] Int. Cl.[5] .............................. G05D 7/06
[52] U.S. Cl. ............................ 222/644; 222/651; 222/375; 222/385
[58] Field of Search ............. 222/644, 651, 375, 377, 222/385, 333; 68/17 R; 134/99.2

[56] References Cited

U.S. PATENT DOCUMENTS

| | | | |
|---|---|---|---|
| 2,948,437 | 8/1960 | Nielsen | 222/70 |
| 3,043,478 | 7/1962 | Adams et al. | 222/375 |
| 3,044,667 | 7/1962 | Lucas | 222/454 |
| 3,133,673 | 5/1964 | Buss | 222/70 |
| 3,220,607 | 11/1965 | Seal | 222/54 |
| 3,334,789 | 8/1967 | Kay et al. | 222/651 |
| 3,370,751 | 2/1968 | Braga | 222/76 |
| 3,771,333 | 11/1973 | Jurjans | 68/12 R |
| 3,982,666 | 9/1976 | Kleimola et al. | 222/70 |

*Primary Examiner*—Sherman Basinger
*Attorney, Agent, or Firm*—Timmons & Kelly

[57] ABSTRACT

The device of the invention dispenses a liquid, such as detergent or softener, into a clothes washing machine. The device includes two components: a container and a nozzle assembly. The container holds a quantity of liquid and a vane pump. The pump pumps the liquid through a conduit to the nozzle assembly. An anti-siphon tube is located in a hole in the conduit, within the container, but above the level of the liquid. When the pump is shut off, the anti-siphon tube prevents the creation of a siphon effect within the conduit. The nozzle assembly includes a nozzle housing, a hose from the container to the nozzle housing, and a nozzle to direct the liquid into the tub of the washing machine.

14 Claims, 3 Drawing Sheets

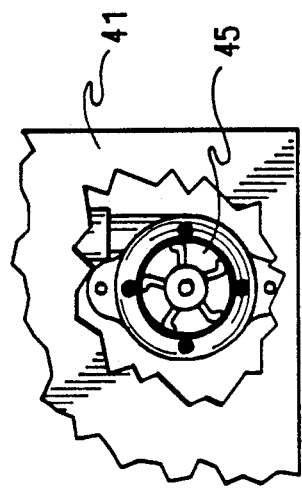
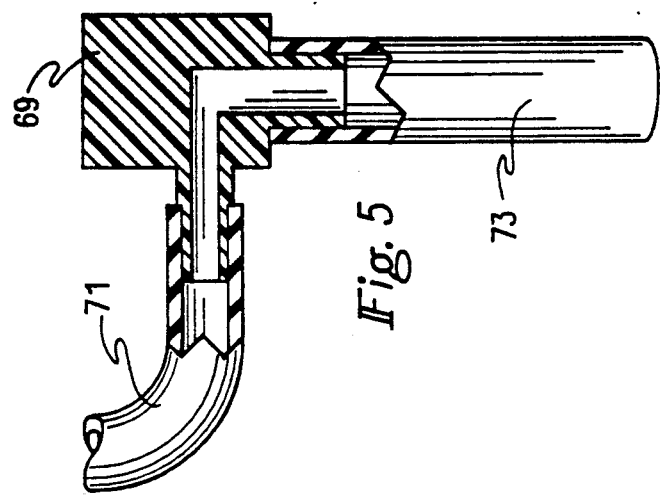
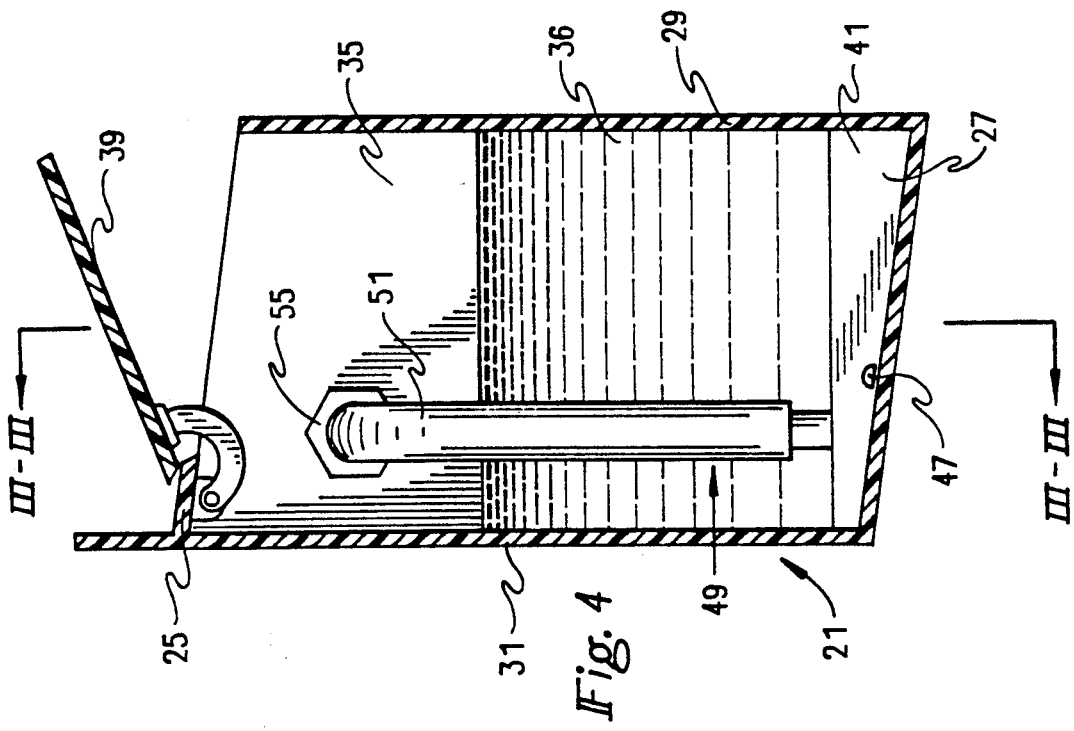

LIQUID DISPENSER FOR USE WITH WASHING MACHINE

BACKGROUND OF THE INVENTION

1. Field of the Invention

This invention relates in general to liquid dispensers. In particular, the invention relates to devices for dispensing liquids, such as soap or softener, into clothes washing machines.

2. Description of the Prior Art

Clothes washing machines have greatly automated the household chore of washing clothes. In most washing machines, however, the tasks of adding liquid detergent and softeners remains a manual operation. The clothes are loaded into the machine, and then the detergent and softeners are measured and added to the tub by hand.

Attempts have been made in the past to automate the clothes washing operation as much as possible, especially for large industrial sized washing machines, by providing an automatic detergent and softener dispenser. Some of these devices were designed for liquids and others are for powders. However, in general, the prior art devices are complicated and expensive to manufacture, to use, and to maintain.

There remains, therefore, a need for an inexpensive, automatic liquid dispenser for home washing machines. It is especially important that the dispenser be easy to use and to maintain.

SUMMARY OF THE INVENTION

The general object of the invention is to dispenser liquid detergent, softener, and other liquids into the tub of a clothes washing machine. This object is accomplished by an apparatus having a container for holding a selected amount of liquid detergent and softener, and a quantity of air above the surface of the liquid. A pump pumps the liquid out of the container to a dispensing nozzle assembly.

An anti-siphon tube is located in a hole in a conduit between the pump and an opening in the container. When the pump is turned off, the anti-siphon tube allows air from the upper portion of the container to enter the conduit, thus preventing a siphon effect. The tube is located in a hole on the lower side of the conduit, so that liquid pumped through the conduit and through the tube will remain in the container.

The nozzle assembly includes a nozzle housing, a hose from the container to the nozzle housing, and a nozzle. The nozzle directs the liquid into the tub of the washing machine.

The above, as well as additional objects, features, and advantages of the invention will become apparent in the following detailed description.

BRIEF DESCRIPTION OF THE DRAWINGS

FIG. 4 is a sectional right side elevation of the container portion of the liquid dispenser of the invention, as seen along line IV—IV in FIG. 2.

FIG. 4A is a sectional right side elevation of the motor housing of the liquid dispenser of the invention, with a portion broken away for clarity.

FIG. 5 is a top plan view of the dispensing nozzle assembly portion of the liquid dispenser of the invention, shown partially in section.

DESCRIPTION OF THE PREFERRED EMBODIMENT

Figure 1:
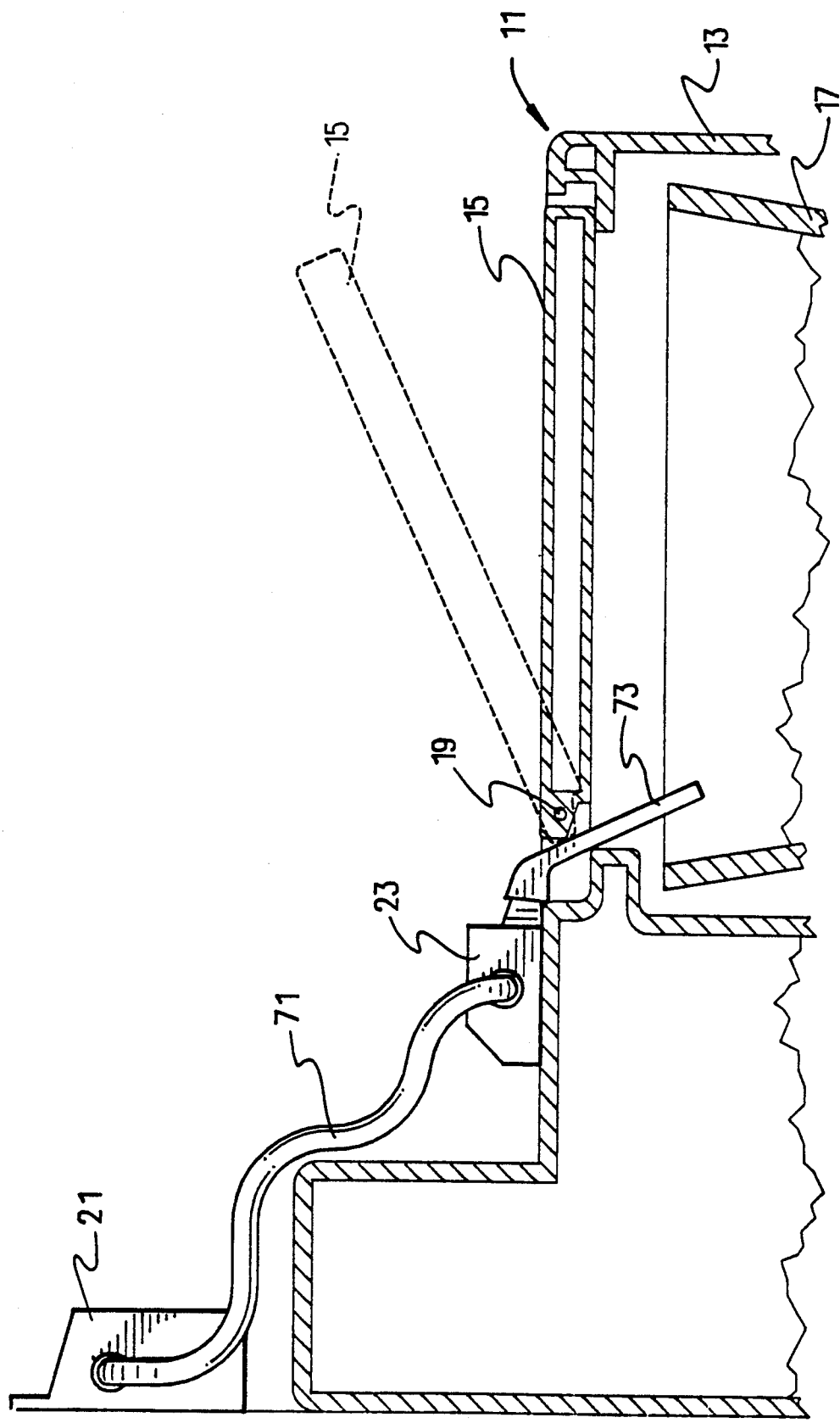
FIG. 1 is a right side elevation of the liquid dispenser of the invention, shown installed on a clothes washing machine, shown in section.

As shown in FIG. 1, the liquid dispenser of the invention may be used with a standard clothes washing machine 11, having a body 13, a lid 15, and a tub 17. In the embodiment shown, the washing machine 11 is a top loading machine, having its lid 15 on the top of the machine 11. The lid 15 pivots upward about an axis 19 along the rear of the lid 15, so that clothes can be placed into the tub 17.

Figure 3:
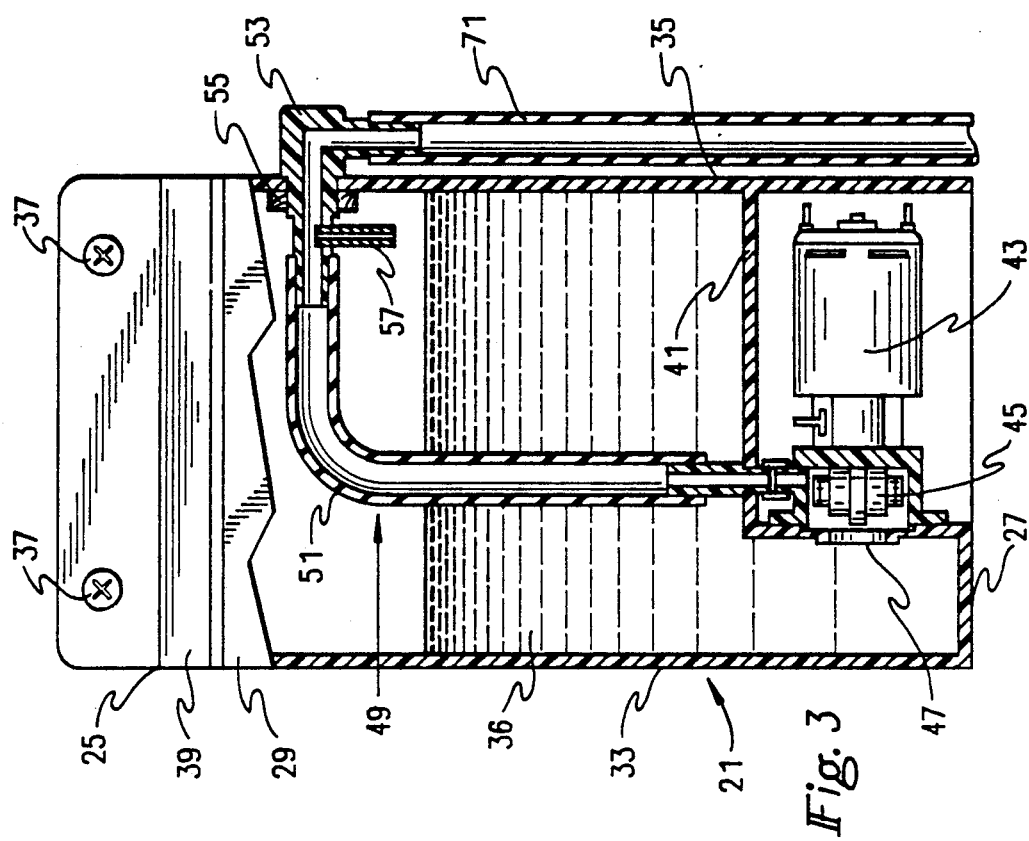
FIG. 3 is a sectional front elevation of the container portion of the liquid dispenser of the invention, as seen along line III—III in FIG. 4.

The liquid dispenser of the invention includes two major components: a container 21 and a nozzle assembly 23. The container 21 may be mounted on a wall or on a cabinet near the washing machine 11. The container 21 is shown in more detail in FIGS. 2–4, and the nozzle assembly 23 is shown in more detail in FIG. 5.

The container 21 has a top 25, a bottom 27, a front 29, a back 31, and two sides 33 and 35, to contain a selected quantity of liquid detergent, softener, or other liquids 36. The bottom 27 of the container 21 is approximately three inches by four inches, and the front 29 of the container 21 is about eight inches tall. The back 31 of the container 21 is about nine and a half inches tall, so the back 31 extends up above the front 29. The top 25 extends upward from the front 29 to the back 31, leaving about one inch of the back 31 extending upward above the top 25 of the container 21.

The portion of the back 31 that extends above the top 25 has a pair of screw holes, so that the container 21 can be attached to a wall. The top 25 includes a lid 39 that can be raised to provide access to the interior of the container 21.

A motor housing 41 in the container 21 houses a vane pump 43 powered by a nine volt D.C. motor 45. A three eights inch hole 47 in the motor housing 41 allows the liquid 36 in the container 21 to enter the vane pump 43. When the motor 45 drives the vane pump 43, the pump 43 pumps the liquid 36 upward through a conduit 49.

The conduit 49 includes a flexible tube 51 and a fitting 53. The fitting 53 is mounted in an opening in the left side 35 of the container 21 above the surface of the liquid 36. The fitting 53 is held in place with a nut 55.

An anti-siphon tube 57 is located in a hole on the lower side of the fitting 53. One end of the anti-siphon tube 57 is located within the fitting 53 and the other end is located within the container 21 above the surface of the liquid 36. The tube thus provides an passageway between the air in the container 21 and the inside of the conduit 49.

Figure 2:
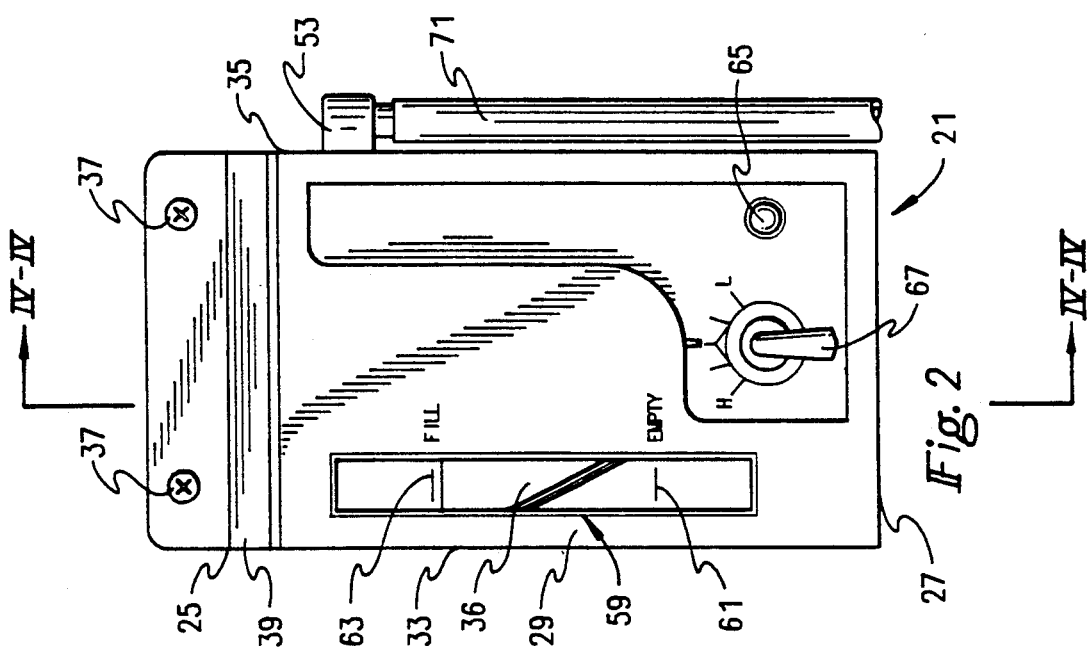
FIG. 2 is a front elevation of the container portion of the liquid dispenser of the invention.

As shown in FIG. 2, the container 21 has a gauge 59 to show the level of the liquid 36 within the container 21. The level of the liquid 36 should be maintained between a minimum "empty" mark 61 and a maximum "full" mark 63. If the level of the liquid 36 falls below the "empty" mark 61, the pump 45 may not operate properly. If the level of the liquid 36 is above the "full" mark 63, the anti-siphon tube 57 will be covered, and will not operate properly.

Also shown in FIG. 2 are the controls for the dispenser. The controls include a start button 65 and a selector switch 67. The selector switch 67 can be manually set at any position between "high" and "low." The preferred switch position depends upon the amount of liquid desired. Generally, if the load of clothes are to be washed is large or especially dirty, a larger amount of liquid will be used.

After the switch 67 has been set, the start button 65 can be pushed to start the dispenser. If the switch is set on "high," the dispenser will operate for about five or six seconds, and dispense about four ounces of liquid 36. If the switch 65 is set on low, the dispenser will dispense about one ounce of liquid 36.

The electronics to control the pump 45 are well-known integrated circuit technology. The electronic controls include a timer that is controlled by the selector switch 67 and the start button 65. The timer then starts and stops the pump 45 to dispense the desired amount of liquid 36.

The nozzle assembly 23 of the invention is shown in FIG. 1 and 5. The assembly 23 includes a nozzle housing 69 and a hose 71 to direct the liquid 36 from the fitting 53 to the nozzle housing 69. The nozzle housing 69 is approximately one and one half inches square, and about three quarters of an inch high. The nozzle housing 69 is attached to the washing machine body 13 with a magnet or an adhesive.

The nozzle assembly 23 also includes a flexible rubber nozzle 73 attached to the nozzle housing 69. The nozzle 73 directs the liquid from the nozzle housing 69 to the tub 17 of the washing machine 11. The nozzle 73 must be less than about one quarter inch thick, so that it will fit between the washing machine body 13 and the washing machine lid 15, as shown in FIG. 1. The nozzle 73 is preferably about four or five inches long, so that it will direct the liquid into the tub 17 without interfering with placing clothes into the tub 17 or removing the clothes from the tub 17.

The invention has several advantages over the prior art. The anti-siphon tube 57 provides a simple and effective method of shutting off the flow of liquid 36, by preventing the formation of a siphon effect. The dispenser of the invention is inexpensive, effective, and easy to use.

The invention has been described in only one embodiment. It should be apparent to those skilled in the art that the invention is not so limited, but is susceptible to various changes and modifications without departing from the spirit of the invention.

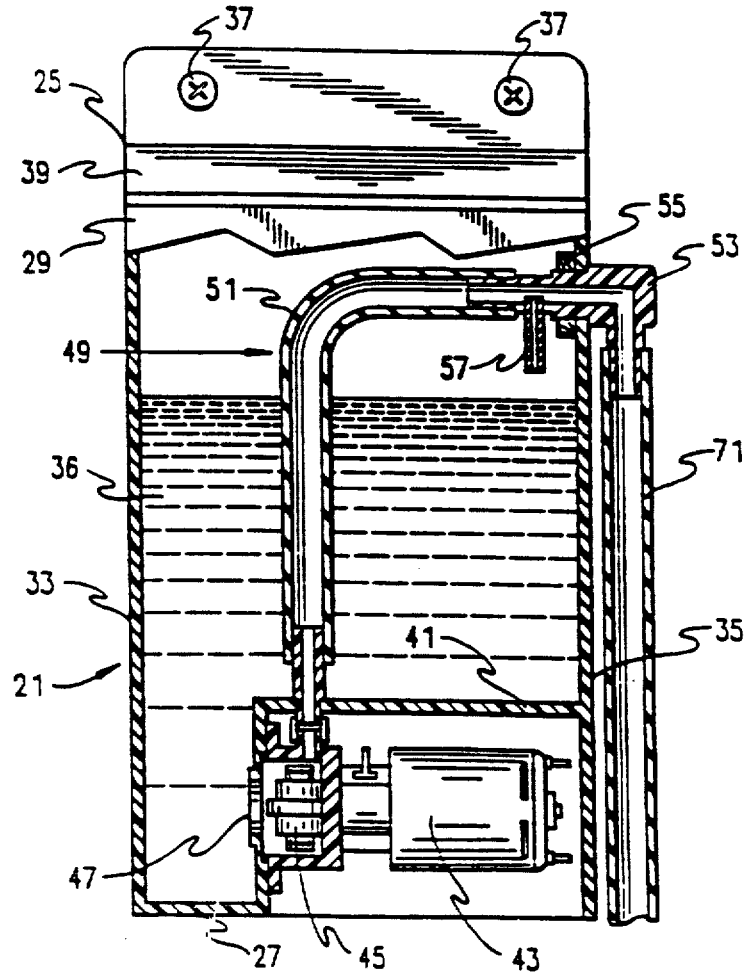

We claim:

1. A dispenser for dispensing a liquid into a tub of a washing machine, comprising:
   a container for holding a selected amount of liquid and a quantity of air above the surface of the liquid;
   a pump for pumping the liquid out of the container;
   control means for turning the pump on for a selected period of time;
   a conduit extending from the pump to an opening in the container, wherein a portion of the conduit passes through the air in the container, the conduit having a hole through which air is drawn from the container into the conduit when the pump is shut off; and
   a dispensing nozzle assembly for directing the liquid from the opening in the container to the tub of the washing machine.

2. A liquid dispenser as recited in claim 1, further comprising an anti-siphon tube inserted into the hole in the conduit.

3. A liquid dispenser as recited in claim 2, wherein one end of the anti-siphon tube is located within the conduit and the other end is located within the container above the surface of the liquid.

4. A dispenser for dispensing a liquid into a tub of a washing machine, comprising:
   a container for holding a selected amount of liquid and a quantity of air above the surface of the liquid;
   a pump for pumping the liquid out of the container;
   control means for turning the pump on for a selecting period of time;
   a conduit extending from the pump to an opening in the container, wherein a portion of the conduit is located in the air above the surface of the liquid, the conduit having a hole through which air is drawn into the conduit when the pump is shut off;
   an anti-siphon tube inserted into the hole in the conduit, wherein one end of the anti-siphon tube is located within the conduit and the other end is located within the container above the surface of the liquid, and wherein the hole is located on the lower side of the conduit and the anti-siphon tube extends downward from the hole; and
   a dispensing nozzle assembly for directing the liquid from the opening in the container to the tub of the washing machine.

5. A dispenser for dispensing a liquid into a tub of a washing machine, comprising:
   a container for holding a selected amount of liquid and a quantity of air above the surface of the liquid;
   a pump for pumping the liquid out of the container;
   control means for turning the pump on for a selected period of time;
   a conduit extending from the pump to an opening in the container, wherein a portion of the conduit passes through the air in the container, the conduit having a hole through which air is drawn from the container into the conduit when the pump is shut off;
   a nozzle housing attached to the washing machine;
   a hose for directing the liquid from the opening in the container to the nozzle housing; and
   a nozzle for directing the liquid from the nozzle housing to the tube of the washing machine.

6. A liquid dispenser as recited in claim 5, further comprising an anti-siphon tube inserted into the hole in the conduit.

7. A liquid dispenser as recited in claim 6, wherein one end of the anti-siphon tube is located within the conduit and the other end is located within the container above the surface of the liquid.

8. A liquid dispenser as recited in claim 7, wherein the hole is located on the lower side of the conduit and the anti-siphon tube extends downward from the hole.

9. A liquid dispenser as recited in claim 5, wherein the nozzle is less than one quarter inch thick so that the nozzle will fit between the housing and the door of a standard clothes washing machine.

10. A dispenser for dispensing a liquid into a tub of a washing machine, comprising:
    a container for holding a selected amount of liquid and a quantity of air above the surface of the liquid;
    a pump for pumping the liquid out of the container;
    control means for turning the pump on for a selected period of time;

a fitting mounted within an opening in the container above the surface of the liquid; and having a hole through which air is drawn from the container into the fitting when the pump is shut off;

a tube for directing the liquid from the pump to the fitting;

a nozzle housing attached to the washing machine;

a hose for directing the liquid from the fitting to the nozzle housing; and a nozzle for directing the liquid from the nozzle housing to the tub of the washing machine.

11. A liquid dispenser as recited in claim 10, further comprising an anti-siphon tube inserted into the hole in the fitting.

12. A liquid dispenser as recited in claim 11, wherein one end of the anti-siphon tube is located within the fitting and the other end is located within the container above the surface of the liquid.

13. A liquid dispenser as recited in claim 12, wherein the hole is located on the lower side of the fitting and the anti-siphon tube extends downward from the hole.

14. A liquid dispenser as recited in claim 10, wherein the nozzle is less than one quarter inch thick so that the nozzle will fit between the housing and the door of a standard clothes washing machine.

* * * * *

UNITED STATES PATENT AND TRADEMARK OFFICE
CERTIFICATE OF CORRECTION

PATENT NO. : 5,267,676
DATED : December 7, 1993
INVENTOR(S) : Anita C. Jones, et. al.

It is certified that error appears in the above-indentified patent and that said Letters Patent is hereby corrected as shown below:

The Title page should be deleted to appear as per attached Title page.

Signed and Sealed this

Twentieth Day of September, 1994

Attest:

BRUCE LEHMAN

Attesting Officer

Commissioner of Patents and Trademarks

United States Patent [19]

Jones et al.

[11] Patent Number: 5,267,676
[45] Date of Patent: Dec. 7, 1993

[54] LIQUID DISPENSER FOR USE WITH WASHING MACHINE

[76] Inventors: Anita C. Jones, 182 Old Mill Way, Conyers, Ga. 30208; Jack J. Gilbert, 740-E Hembree Pl., Roswell, Ga. 30076

[21] Appl. No.: 864,421

[22] Filed: Apr. 6, 1992

[51] Int. Cl.⁵ .............................. G05D 7/06
[52] U.S. Cl. ........................ 222/644; 222/651; 222/375; 222/385
[58] Field of Search ............ 222/644, 651, 375, 377, 222/385, 333; 68/17 R; 134/99.2

[56] References Cited

U.S. PATENT DOCUMENTS

| | | | |
|---|---|---|---|
| 2,948,437 | 8/1960 | Nielsen | 222/70 |
| 3,043,478 | 7/1962 | Adams et al. | 222/375 |
| 3,044,667 | 7/1962 | Lucas | 222/454 |
| 3,133,673 | 5/1964 | Buss | 222/70 |
| 3,220,607 | 11/1965 | Seal | 222/54 |
| 3,334,789 | 8/1967 | Kay et al. | 222/651 |
| 3,370,751 | 2/1968 | Braga | 222/76 |
| 3,771,333 | 11/1973 | Jurjans | 68/12 R |
| 3,982,666 | 9/1976 | Kleimola et al. | 222/70 |

*Primary Examiner*—Sherman Basinger
*Attorney, Agent, or Firm*—Timmons & Kelly

[57] ABSTRACT

The device of the invention dispenses a liquid, such as detergent or softener, into a clothes washing machine. The device includes two components: a container and a nozzle assembly. The container holds a quantity of liquid and a vane pump. The pump pumps the liquid through a conduit to the nozzle assembly. An anti-siphon tube is located in a hole in the conduit, within the container, but above the level of the liquid. When the pump is shut off, the anti-siphon tube prevents the creation of a siphon effect within the conduit. The nozzle assembly includes a nozzle housing, a hose from the container to the nozzle housing, and a nozzle to direct the liquid into the tub of the washing machine.

14 Claims, 3 Drawing Sheets